Aug. 7, 1945.  B. B. HARMAN  2,381,217
AIRCRAFT CONTROL COLUMN
Filed July 26, 1943  2 Sheets-Sheet 1
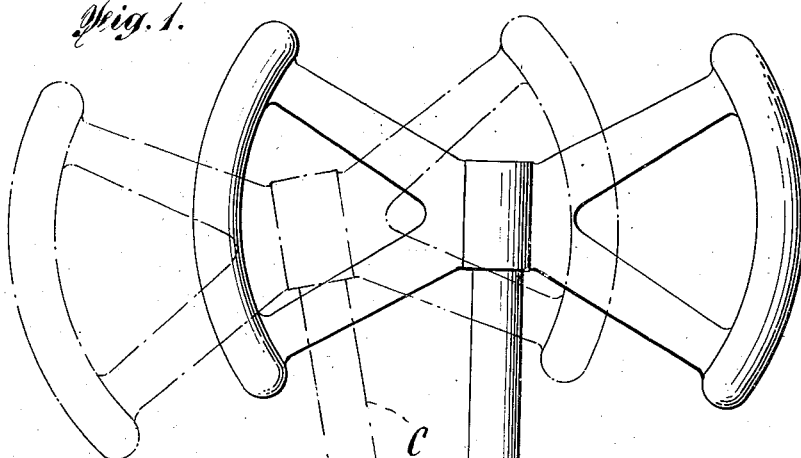
Fig. 1.
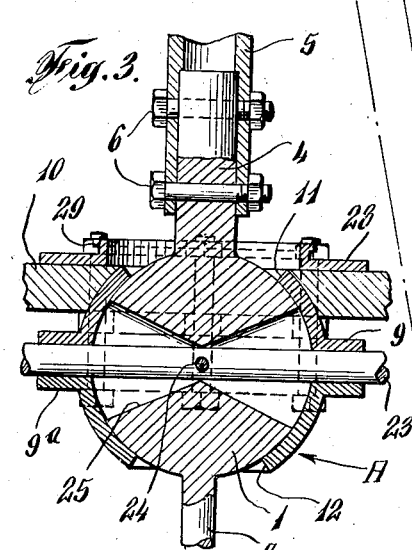
Fig. 3.
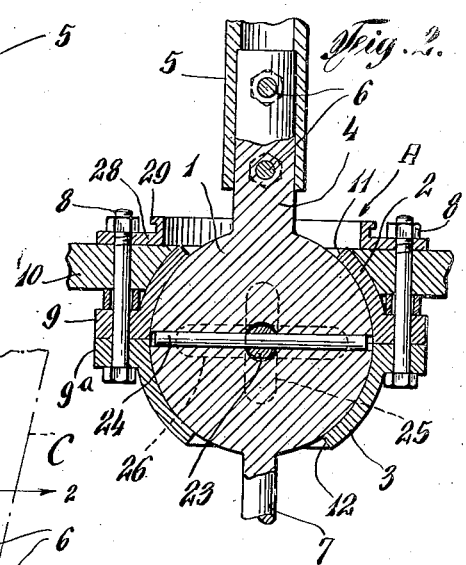
Fig. 2.
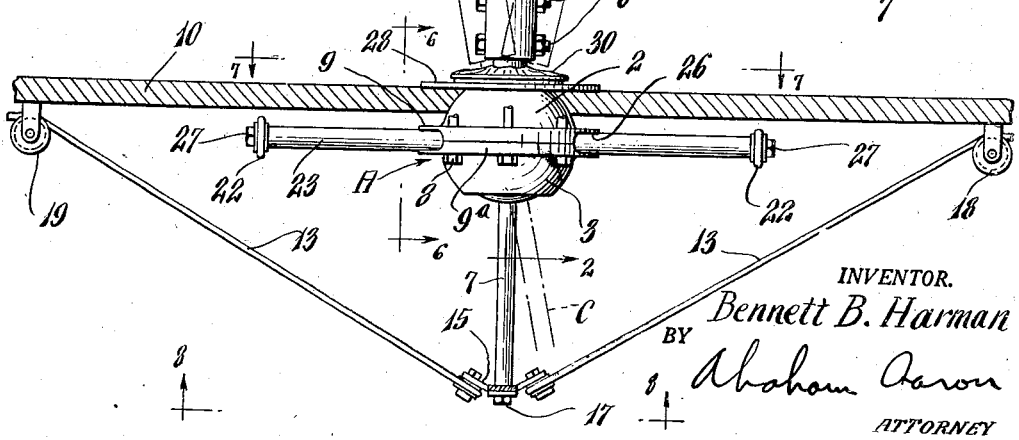
INVENTOR.
Bennett B. Harman
BY
Abraham Aaron
ATTORNEY

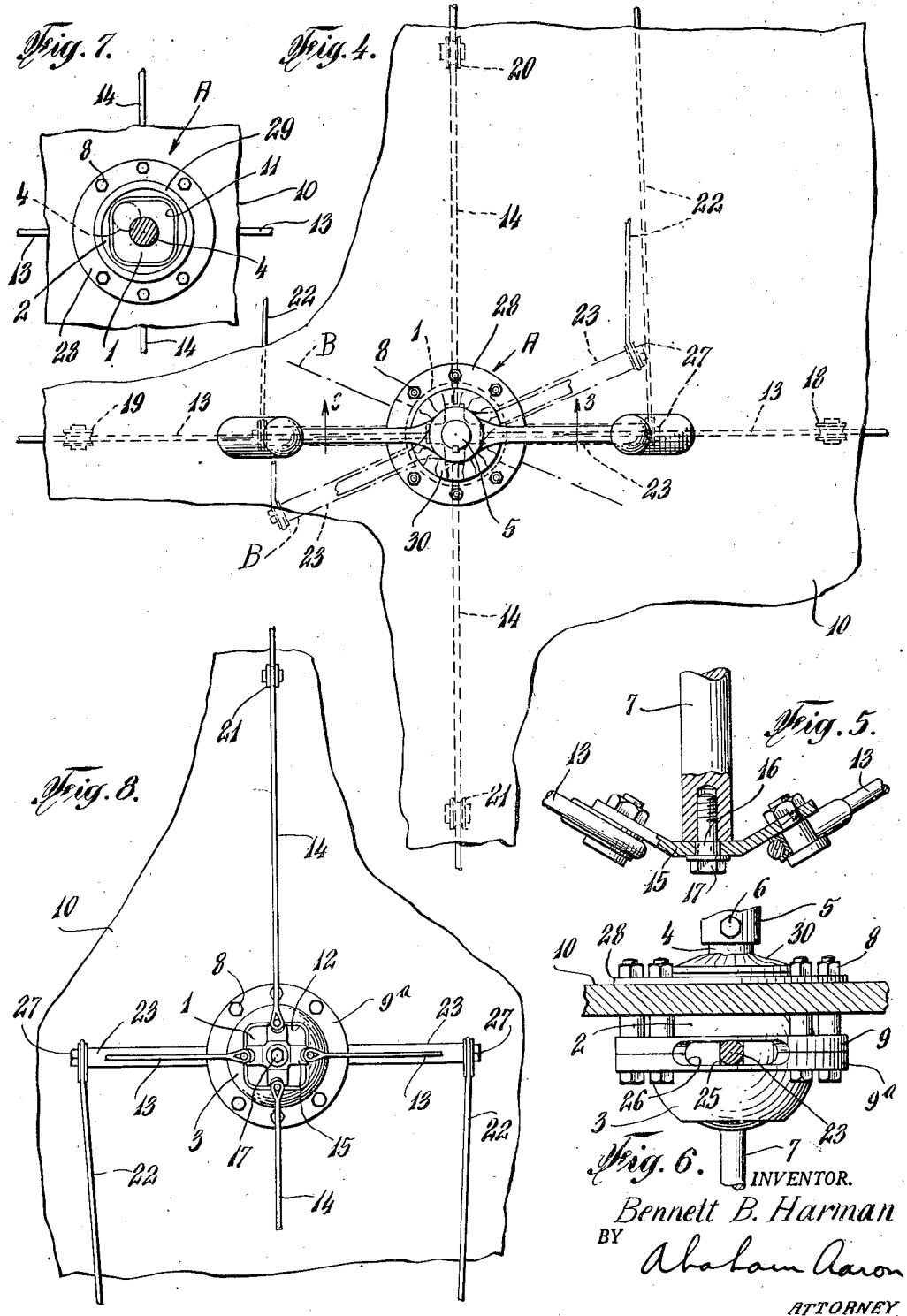

Patented Aug. 7, 1945

2,381,217

UNITED STATES PATENT OFFICE 2,381,217

AIRCRAFT CONTROL COLUMN

Bennett B. Harman, Jamaica, N. Y.

Application July 26, 1943, Serial No. 496,130

1 Claim. (Cl. 244—83)

The main object of my invention is to replace both the presently used foot operated rudder control and the hand operated control column or "joy-stick," with a single hand operated centralized controlling device. My device is designed for the control and activation of the three major control surfaces of the standard aircraft, namely, the ailerons, elevators and rudder, by means of a central control. With installation of my device in a standard aircraft and the hookup to conventional control cables of that aircraft, the control and activation of each of the control surfaces is centralized in the one manually operated control column in such a manner as to allow for the activation of any one of these control surfaces independently of the other two, or in conjunction with either of the other two, or any combination of the three.

A further object of my invention is to allow for the elimination of foot operated rudder control thereby leaving the feet free for operation of landing gear brakes or the possible installation, in addition to the conventional handthrottle of a standard air craft, of a foot operated throttle as a safety aid in taxiing, take-offs or landings.

A further object of my invention is to provide a control device whose manual operation is such as to conform with the operator's natural and instinctive movements in controlling an aircraft.

Referring to the drawings:

Figure 1 is a front elevation, showing my device in neutral position.

Figure 2 is a section on the line 2—2 of Figure 1.

Figure 3 is a section on the line 3—3 of Figure 4.

Figure 4 is a view looking down on Figure 1.

Figure 5 is a fragmentary view of aileron-elevator shaft and bracket.

Figure 6 is a section on the line 6—6 of Figure 1.

Figure 7 is a section on the line 7—7 of Figure 1.

Figure 8 is a bottom view of my device looking up in the direction of line 8—8 of Figure 1.

Referring more specifically to the drawings:

My device is built around the ball 1, partially enclosed in a fixed housing A. The inner surface of the housing A is so fitted to the ball 1 as to form a bearing surface in which the ball 1 is free moving in any direction. Extending from this ball 1 at the top is an extension 4. Fixed to this extension 4 is the manually operated main control shaft 5, which is attached to extension 4 by means of bolts 6. Extending from the bottom of the ball 1, and fixed to it, is the aileron elevator activating shaft 7. The housing A is composed of two half-cups 2 and 3, which are held together by bolts 8 running through flanges 9 and 9a respectively, which encircle the horizontal circumference of the housing A. These bolts 8 extend up through the floor board 10 of the aircraft, thereby affixing the housing A to the underside of the floor board 10. Square cutouts both on the top 11 and the bottom 12 of the housing A allow for free movement of the main control shaft 5 and consequently the aileron elevator activating shaft 7 from front to back, from side to side, or front and either side, or back and either side, i. e., free movement of the main control shaft 5, and the resulting movements of the aileron-elevator activating shaft 7, throughout the form of the squares 11 and 12 respectively.

The aileron cable 13—13 and the elevator cables 14—14 are connected to the bottom of the aileron-elevator activating shaft 7 by means of a bracket 15 mounted free-riding on a bushing 16 which is affixed by a bolt 17 to the bottom of the shaft 7 so that the bracket 15 is not affected by the rotation of the shaft 7. The aileron control cables 13—13 which run from a pulley 18 mounted to the underside of the floor board 10 on one side of the device drop down to be connected to the aforementioned bracket 15, thence up to a pulley 19, mounted to the underside of the floor board 10, on the opposite side of the device. The ailerons are activated and controlled by movement of the aileron cables 13—13 which is induced by the manual movement of the main control shaft 5 and the resultant movement of the aileron elevator activating shaft 7 from side to side as indicated at C of Figure 1. The elevator control cables 14—14 which run from a pulley 20 mounted to the underside of the floor board 10, at the rear of the device, drop down to be connnected to the aforementioned bracket 15 thence up to a pulley 21, mounted to the underside of the floor board 10 at the front of the device. The elevators are activated and controlled by movement of the elevator cables 14—14 which is induced by the manual movement of the main control shaft 5 and the resultant movement of the aileron elevator activating shaft 7, from front to back or conversely. The activation of either set of cables, aileron or elevator, results in no side strain on the other set of cables but rather in an easy swing of the dropped section as shown by cables 13—13 of Figure 1.

The ball 1 is pierced through the center by a vertical slot 25, through which the rudder bar 23 passes horizontally from side to side. This rudder bar 23, is held in place by a pin 24 which is fixed horizontally from front to back through the center of the ball 1, passing through the center of the rudder bar 23 and upon which the rudder bar 23 is free riding vertically. The slot 25 permits limited clockwise or counterclockwise rotation of the ball 1 about pin 24 when the control stick is moved sidewise. Front and back movement of the main control shaft 5, would result only in a partial rotation of the rudder bar 23. The rudder cables 22—22 are connected to the ends of the rudder bar 23 by means of a shoulder screw 27, on which they are free riding, so that they are not affected by the aforementioned partial rotation of the rudder bar 23. This rudder bar 23 also passes through a horizontal slot 26, cut through the flanges 9 and 9a and housing A on each side, which allows the end of the rudder bar 23 to swing from front to back, from the neutral, i. e., straight side to side position. The rudder is activated and controlled by the movement of the rudder cables 22—22 which is induced by the manual rotation of the main control shaft 5, which results in this front to back action of the rudder bar 23, as indicated at B of Figure 4. The rudder cables 22—22 are crossed in their hook-up to the rudder so as to give the operator a normal steering action in the operation of the rudder control.

A circular plate 28 encircles the open area of the floor board 10 to reinforce the floor board 10 against the pressure of the bolts 8. The plate 28 has a circular lip 29, which provides for the attachment of dust boot 30, to protect the moving parts against foreign matter.

A conventional dust cover would be used under the floor board 10 to enclose the entire housing A leaving extending parts of the rudder bar 23 and the aileron elevator activating shaft 7 exposed, thereby protecting the moving parts in the housing A from foreign matter.

To carry out the purpose of my invention, slight improvements may be made without departing from the broad scope of my invention.

What I claim as new and useful is:

In an aircraft having a floorboard, a control centralizing the activation of the three major aircraft control surfaces, namely, ailerons, elevator and rudder; said control consisting of a movable ball, a spherical housing secured to the bottom of the floorboard and partially enclosing the ball, said housing being open at the top and bottom and composed of upper and lower flanged half-cups, said housing formed with a horizontal slot cutting the flanges on opposite sides, said ball being formed with a vertical transverse slot therethrough, a rudderbar passing through the slots in the housing and ball and having rudder cables secured to the ends thereof, a retaining pin in the ball holding the rudder bar in place, a manual control member secured to and extending upwardly from the upper portion of said ball, a shaft fixed to and extending downwardly from the bottom of the ball, a bracket pivotally mounted at the bottom end of said shaft, and cables operatively connecting the elevators and ailerons to said bracket.

BENNETT B. HARMAN.